US009569284B2

(12) United States Patent
Contractor et al.

(10) Patent No.: US 9,569,284 B2
(45) Date of Patent: Feb. 14, 2017

(54) COMPOSING APPLICATIONS ON A MOBILE DEVICE

(71) Applicant: International Business Machines Corporation, Armonk, NY (US)

(72) Inventors: Danish Contractor, Bangalore (IN); Sachindra Joshi, Bangalore (IN); Ashish Verma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/584,084

(22) Filed: Dec. 29, 2014

(65) Prior Publication Data

US 2016/0188383 A1   Jun. 30, 2016

(51) Int. Cl.
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |

(52) U.S. Cl.
CPC ...................................... G06F 9/54 (2013.01)

(58) Field of Classification Search
None
See application file for complete search history.

(56) References Cited

U.S. PATENT DOCUMENTS

| 6,449,659 | B1* | 9/2002 | Caron ....................... G06F 8/70 712/E9.084 |
| 8,437,784 | B2 | 5/2013 | Trioano et al. |
| 8,614,968 | B1* | 12/2013 | Cody ................ H04M 1/72519 370/260 |
| 2005/0044165 | A1* | 2/2005 | O'Farrell ............... G06Q 10/10 709/213 |
| 2005/0246304 | A1 | 11/2005 | Knight et al. |
| 2007/0260470 | A1* | 11/2007 | Bornhoevd ............ G06Q 10/08 709/203 |
| 2009/0063504 | A1* | 3/2009 | Banister ............ G06F 17/30563 |
| 2010/0329140 | A1 | 12/2010 | Buford et al. |
| 2011/0191790 | A1* | 8/2011 | Ba ............................ G06F 9/44 719/328 |
| 2013/0219309 | A1* | 8/2013 | Jang ..................... G06F 3/0482 715/764 |
| 2013/0268935 | A1 | 10/2013 | Paul et al. |
| 2014/0089379 | A1 | 3/2014 | Davis |

* cited by examiner

Primary Examiner — H S Sough
Assistant Examiner — William C Wood
(74) Attorney, Agent, or Firm — Ryan, Mason & Lewis, LLP

(57) ABSTRACT

Methods, systems, and computer program products for composing applications on a mobile device are provided herein. A method includes exposing multiple capabilities from a set of multiple applications installed on an operating system of a user device to a configuration module executing on the operating system of the user device; defining one or more rules associated with using each of the multiple exposed capabilities; and invoking a combination of two or more of the multiple exposed capabilities, based on said one or more defined rules, to execute a user-defined task, wherein said invoking is executed by a super application executing on the operating system of the user device.

20 Claims, 5 Drawing Sheets

COMPOSING APPLICATIONS ON A MOBILE DEVICE

FIELD OF THE INVENTION

The present application generally relates to information technology, and, more particularly, to mobile device technology.

BACKGROUND

Mobile devices such as smart phones have become powerful devices in terms of both hardware and software features. Additionally, mobile devices can commonly incorporate a variety of applications across multiple platforms, facilitating a rapid growth in applications. Within the mobile device context, applications often request privileges from the device such as access to messages and the ability to enable or disable features such as Wi-Fi, global positioning system (GPS), etc. Additionally, applications on mobile devices commonly have limited awareness regarding other applications on the same mobile device. Applications that interact and/or communicate with one or more other applications are often designed by the same developer and/or organization as complementing features. As such, applications commonly do not have the ability to respond to input/output from other applications unless such ability is hardcoded into the application(s) by design.

SUMMARY

In one aspect of the present invention, techniques for composing applications on a mobile device are provided. An exemplary computer-implemented method can include steps of exposing multiple capabilities from a set of multiple applications installed on an operating system of a user device to a configuration module executing on the operating system of the user device; defining one or more rules associated with using each of the multiple exposed capabilities; and invoking a combination of two or more of the multiple exposed capabilities, based on said one or more defined rules, to execute a user-defined task, wherein said invoking is executed by a super application executing on the operating system of the user device.

In yet another aspect of the invention a user device can include a configuration module, executing on the user device, to compile multiple capabilities exposed from a set of multiple applications installed on the user device, and to define one or more rules associated with using each of the multiple exposed capabilities. The user device also includes a super application, executing on the user device, to invoke a combination of two or more of the multiple exposed capabilities, based on said one or more defined rules, to execute a user-defined task. Additionally, the configuration module is a component of the super application, and wherein the super application is coupled to: (i) a graphical user interface for user manipulation of (a) the multiple exposed capabilities and (b) the one or more defined rules, and (ii) a display for presentation to a user.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes composing high-level applications on a mobile device and/or a user device. As used herein, a mobile device and/or a user device can refer to a portable device such as a mobile telephone, a smart phone, a personal digital assistant (PDA), a wireless email device, a tablet, a game console, etc., or any other information processing device which can benefit from the use of the techniques detailed herein.

At least one embodiment of the invention includes enabling an application (for example, a background application) installed on a given mobile device to interact with one or more other applications installed on the given mobile device by exposing the service capabilities of the given applications (for example, making the service capabilities available for combination, as detailed further herein). The exposed service capabilities can be combined using user-defined rules, triggers and/or settings to accomplish tasks that would otherwise require a new application. Such a combination can result in the creation of a custom user application (or a pseudo application), generated by combining capabilities derived from multiple applications (namely, applications that are already installed on a given mobile device). As such, at least one embodiment of the invention includes enabling a mobile application installed on a mobile device to respond and/or interact in given ways based on one or more rules defined by a user and/or other mobile applications installed on the mobile device, and invoking the capabilities of the noted applications based on the one or more rules.

Figure 1:
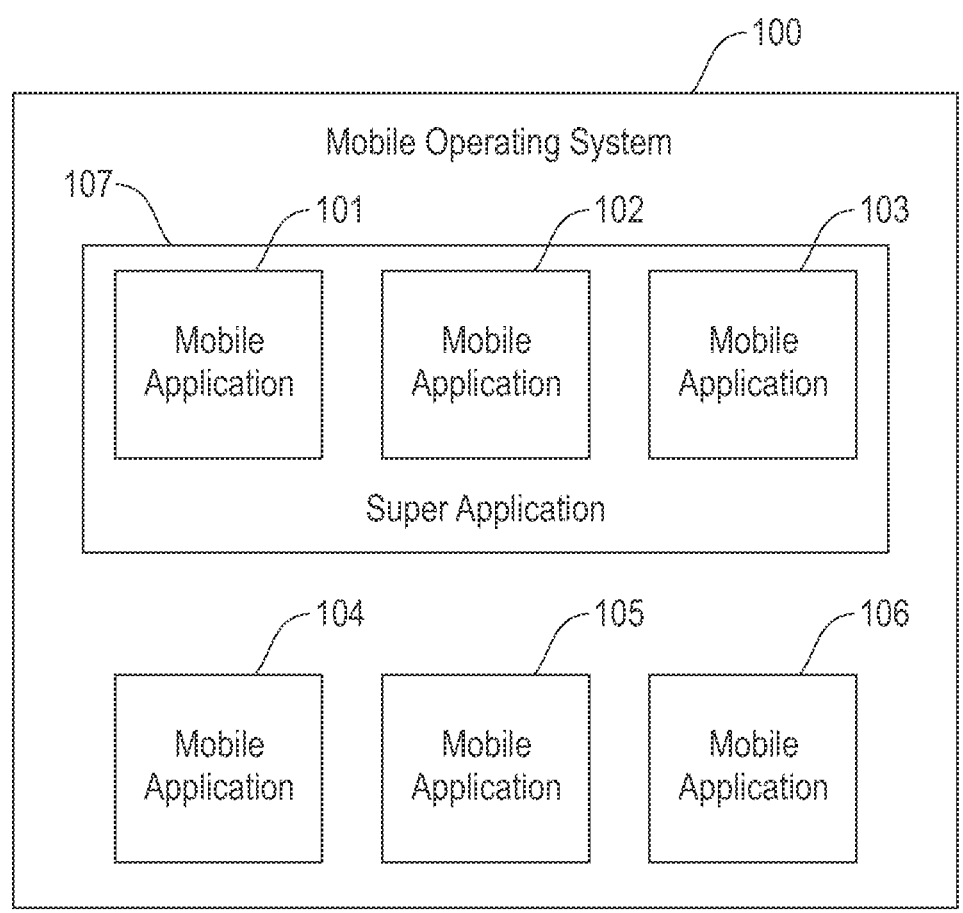
FIG. 1 is a diagram illustrating system architecture, according to an example embodiment of the invention.

FIG. 1 is a diagram illustrating system architecture, according to an example embodiment of the invention. By way of illustration, FIG. 1 depicts a mobile operating system 100, which therein includes multiple mobile applications. Those multiple applications include mobile application 104, mobile application 105 and mobile application 106, all of which are mobile applications that do not expose service capabilities to a super application 107 in conjunction with the example embodiment of the invention depicted in FIG. 1. The mobile operating system 100 also includes, however, super application 107, which includes and/or combines service capabilities and interactions among mobile application 101, mobile application 102 and mobile application 103.

Figure 2:
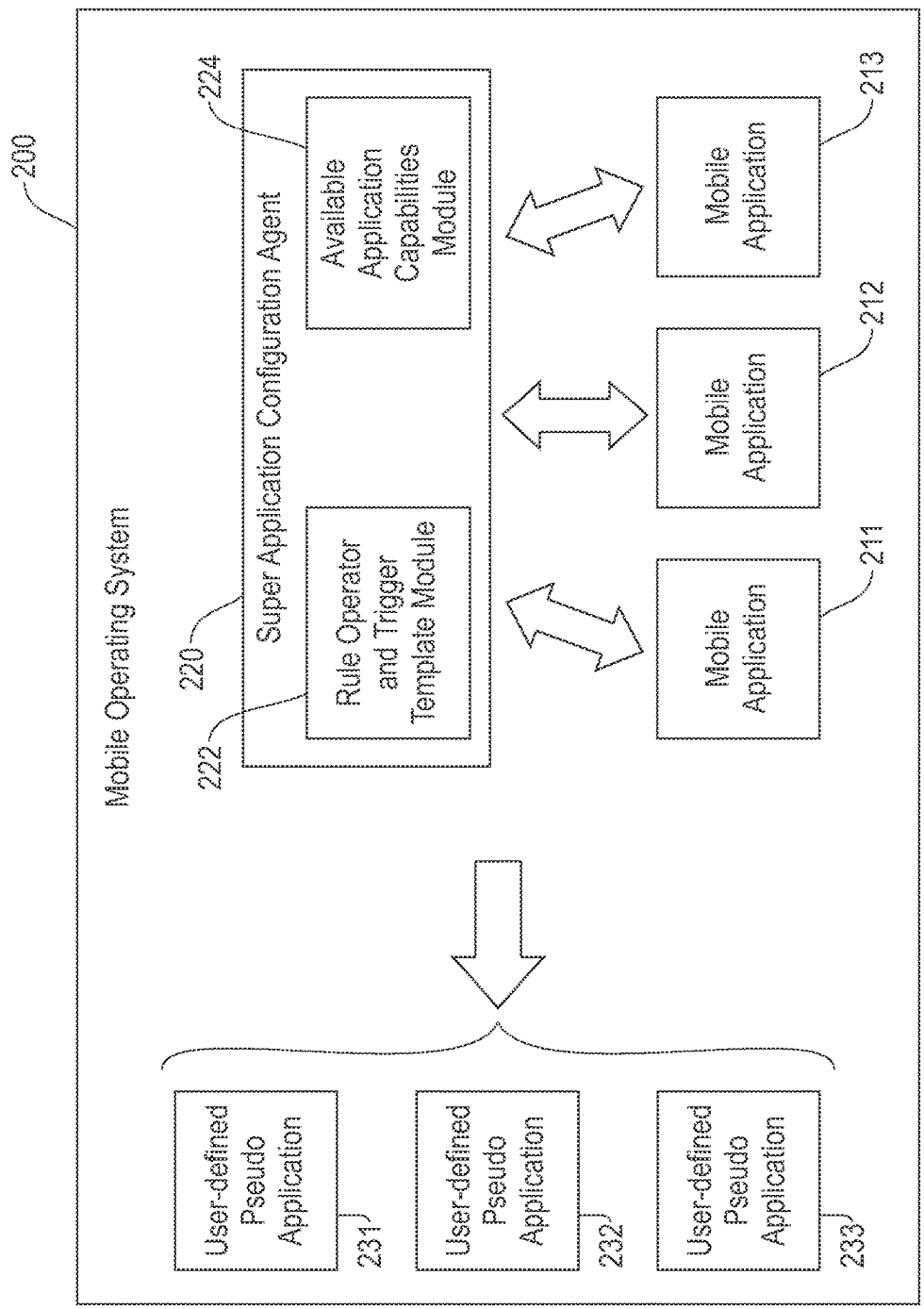
FIG. 2 is a diagram illustrating system architecture, according to an example embodiment of the invention.

FIG. 2 is a diagram illustrating system architecture, according to an example embodiment of the invention. By way of illustration, FIG. 2 depicts a mobile operating system 200, which includes mobile application 211, mobile application 212 and mobile application 213, which communicate and/or interact with super application configuration agent 220. The super application configuration agent 220, which can be a graphical user interface (GUI) definition tool, includes a rule operator and trigger template module 224, as well as an available application capabilities module 224. As further described herein, the super application configuration agent 220 outputs various user-defined pseudo applications, such as user-defined pseudo application 231, user-defined pseudo application 232, and user-defined pseudo application 233.

Applications 211, 212 and 213 expose features as services to the super application configuration agent 220. In at least one embodiment of the invention, exposing features as services can be carried out using an extensible markup language (XML)/JavaScript Object Notation (JSON) interchange format between the super application configuration agent 220 and the installed applications (211, 212 and 213). The super application configuration agent 220, by way of example, can be a feature of the given operating system (OS) 200. Further, the super application configuration agent 220 maintains a record of all applications currently exposing services thereto, and enables a user to configure capabilities to generate a custom user application (or a pseudo application). For example, if a "phone book application" exposes "the caller" entry during a phone call, and the phone's "auto-reject function" or "silent mode function" is also available as a "capability" to the super application configuration agent 220 (via module 224, for example), a given user can define rules using the configuration agent rule operator module 222 to allow calls for certain callers to go through depending on parameters such as the time of day, or the number of calls, etc.

In at least one embodiment of the invention, in connection with the installation of a new application on a given user device, the application will have (or be assigned) a corresponding unique identifier (APP_ID), and each capability of the new application will similarly have (or be assigned) a unique identifier (APP_ID_CAP_ID). Additionally, when the new application is installed, the given user can choose which capability to expose to the super application configuration agent 220 so that the selected capability or capabilities can be used to define pseudo applications (services) (such as pseudo applications 231, 232 and 233 in FIG. 2). The super application configuration agent 220 associates a given APP_ID_CAP_ID with services available from a collection given applications. Accordingly, each application can provide an XML file that maps different capabilities to the implementation of such capabilities in the application.

The super application configuration agent 220 processes the XML file defining the capabilities of the given application, as well as the application's associated arguments, and exposes the information in the definition tool. Here, "processing" the XML file defining the capabilities of the given application includes the super application configuration agent 220 parsing the XML file and exposing capabilities as defined in the XML file. For example, a disk space application can expose a service (that is, a capability) that returns the current disk space available. There can also be applications that accept an input. For example, a phone book application can include a search service which returns a contact entry if the name is found. Additionally, the particular capability exposed for an application depends on the application developer. For example, the capability of a phone book application can include outputting a notification simply that a given user exists, or the capability can include an instruction to "return the phone number" for a given name, etc. The definition tool 220 (that is, the super application configuration agent) can include a GUI which lists different capabilities and possible arguments from which users can choose to combine using operators to define one or more pseudo applications that can execute in the given operating system. As used herein, arguments refer to values that are needed to instantiate a capability. As an example, for the capability "Call X," X is an argument and X is a person's name in the address book. Using the definition tool 220, a user can combine capabilities from different applications installed on the system (such as applications 211, 212 and 213 in FIG. 2) to execute one or more tasks without requiring application development or programming.

Accordingly, in at least one embodiment of the invention, the configuration agent is used to define user applications by combining capabilities from other applications. Further, in such an embodiment, the configuration agent is part of a super application, and the super application is responsible for executing the user-defined application(s).

As noted above, a user can combine capabilities exposed from multiple applications via the use of one or more operators. Examples of such operators can include the following: AND <Application Capability>, OR <Application Capability>, and/or a combination thereof; <Application-specific operator from an exposed application> <Application Capability>; an operator based on a rule and/or an application capability; an event counter; an equality operator; and an inequality operator. As also detailed above, applications can expose capabilities to the super application configuration agent 220. Examples of capabilities can include "Reject Call," "Play music," "Enable Wi-Fi," etc.

Additionally, as described herein, at least one embodiment of the invention includes incorporating and/or implementing one or more rules. Examples of rules can include, by way of illustration, the following:

- If <Battery Low>, <Disable Wi-Fi>. The "Battery low" reading is a capability exposed by a battery manager application on the user device, while the "Disable Wi-Fi" capability is exposed by a Wi-Fi manager application on the user device.
- If <Call from X>, <Allow ring>. The "Call from X" check followed by "Allow Ring" overrides any system settings within the user device for volume, audio modes, etc.
- If <Vehicle Speed from GPS> <Greater than 30 KMPH>, <Auto Reject Incoming Call>.
- If <Battery Less Than 20% Capacity>, <Disable 3G>.
- If <International roaming>, <Disable Data>.
- If <X Calls More Than Y Times in Less Than Z Minutes>, <Enable Ringer>.
- A location-based alarm, wherein such a rule can be used to have location-sensitive reminders. For example, if at the mall, a reminder can be sent to purchase groceries.
- If <On Call for More Than Y Minutes>, <Disable 3G>.
- If <News Push Notification Pertains to Area A>, <Trigger Alarm>.

<Enable Ringer for Caller X Between Time P and Time Q>.

If <A Search for Movie M Identifies Movie M as Having More than T as a Rating>, <Put Movie M in the To-Do List>.

If <A Weather Application Indicates Rainy Weather>, <Trigger a Reminder for an Umbrella>.

<Trigger a Reminder if Disk Space is Less Than D>.

If <Data Usage is Greater than G>, <Disable Background Data>.

If <Short Message Service (SMS) from X Contains the Word "Ring">, <Enable Ringer>.

If <SMS Contains the Word "Lock"> <Lock All Applications>.

Figure 3:
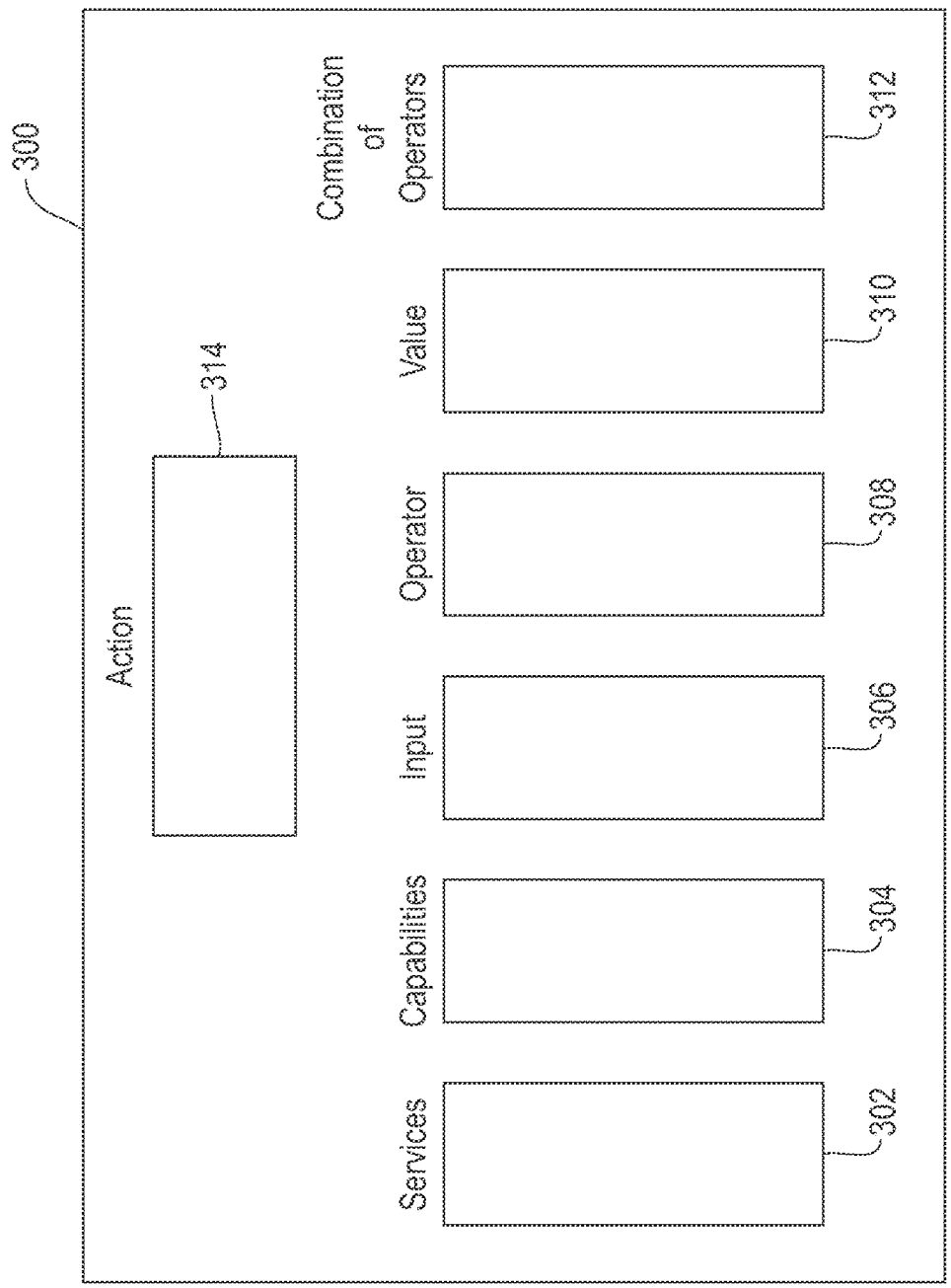
FIG. 3 is a diagram illustrating an interface presenting dialogues and menus, according to an example embodiment of the invention.

FIG. 3 is a diagram illustrating an interface 300 presenting dialogues and menus, according to an example embodiment of the invention. By way of mere example and illustration, FIG. 3 depicts an interface 300 that can be implemented and/or manipulated in the following manner. A user selects a service via interface component 302. Such a service can include, for example, a name look-up in a phone book application. Depending on the service selected, capabilities for that service are displayed via interface component 304. The user then selects a capability from those displayed via interface component 304 (for example, by clicking on the desired capability with a mouse, touching the desired capability on a touchscreen, etc.).

Depending on the capability that is selected, an input field is enabled, as represented by interface component 306 in FIG. 3. The user can then select an input displayed via interface component 306. In this example, such an input might include, for instance, a phone book contact name. Additionally, the user can specify a particular operator (for example, an equals operator (=)) via interface component 308, and the user can also specify a value for the selected input via interface component 310. In this example, the value might include a given name. Also, the value interface component 310 can include free text and/or a drop-down based menu of value options.

The selections and data compilation to this point (that is, the data selected and compiled via interface components 302, 304, 306, 308 and 310) form what is referred to herein as a clause. In at least one embodiment of the invention, the user can conclude the sequence with a single clause, or the user can choose to form one or more additional clauses. In such an embodiment wherein the user forms multiple clauses, the user can select a clause joining operator (such as, for example, AND/OR) via interface component 312.

Additionally, in the example depicted via FIG. 3, the user selects an action (such as, for example, "Reject a Call") via interface component 314, which displays multiple actions which are based on one or more selected capabilities. The multiple actions can be displayed, for example, in a detailed contextual view, such as in connection with the capabilities and services selected in the given clause creation. Also, in one or more embodiments of the invention, a complete expression of an action is available and can be displayed as well.

Figure 4:
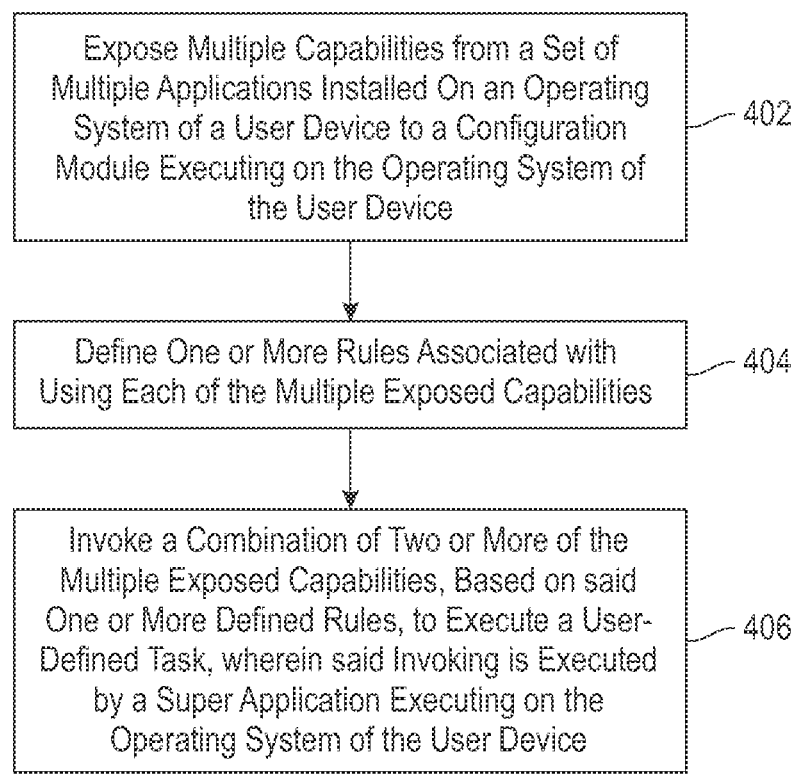
FIG. 4 is a flow diagram illustrating techniques according to an embodiment of the invention.

FIG. 4 is a flow diagram illustrating techniques according to an embodiment of the present invention. Step 402 includes exposing multiple capabilities from a set of multiple applications installed on an operating system of a user device to a configuration module executing on the operating system of the user device.

Step 404 includes defining one or more rules associated with using each of the multiple exposed capabilities. Defining rules can include identifying one or more events that trigger one or more of the rules, and/or identifying one or more settings in which one or more of the rules are applicable. Additionally, defining rules can include determining a type of input to be associated with one or more of the exposed capabilities, and/or determining a type of output to be associated with one or more of the exposed capabilities. Further, defining rules can also include specifying one or more interactions between two or more of the multiple applications installed on the operating system of the user device.

Step 406 includes invoking a combination of two or more of the multiple exposed capabilities, based on said one or more defined rules, to execute a user-defined task, wherein said invoking is executed by a super application executing on the operating system of the user device.

The techniques depicted in FIG. 4 can additionally include maintaining a record of each of the multiple applications from which a capability has been exposed to the configuration module, as well as maintaining a record of each of the multiple capabilities exposed to the configuration module. Further, the techniques depicted in FIG. 4 can include determining a unique identifier corresponding to each of the multiple applications from which a capability has been exposed to the configuration module, and determining a unique identifier corresponding to each of the multiple capabilities exposed to the configuration module. One or more embodiments of the invention can additionally include invoking a combination of exposed capabilities by associating a given unique identifier corresponding to a given capability with each of one or more applications that exposed said given capability to the configuration module.

Also, an additional aspect of the invention includes a user device that includes a configuration module, executing on the user device, to compile multiple capabilities exposed from a set of multiple applications installed on the user device, and to define one or more rules associated with using each of the multiple exposed capabilities. The user device also includes a super application, executing on the user device, to invoke a combination of two or more of the multiple exposed capabilities, based on said one or more defined rules, to execute a user-defined task. Additionally, the configuration module is a component of the super application, and wherein the super application is coupled to: (i) a graphical user interface for user manipulation of (a) the multiple exposed capabilities and (b) the one or more defined rules, and (ii) a display for presentation to a user.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 5:
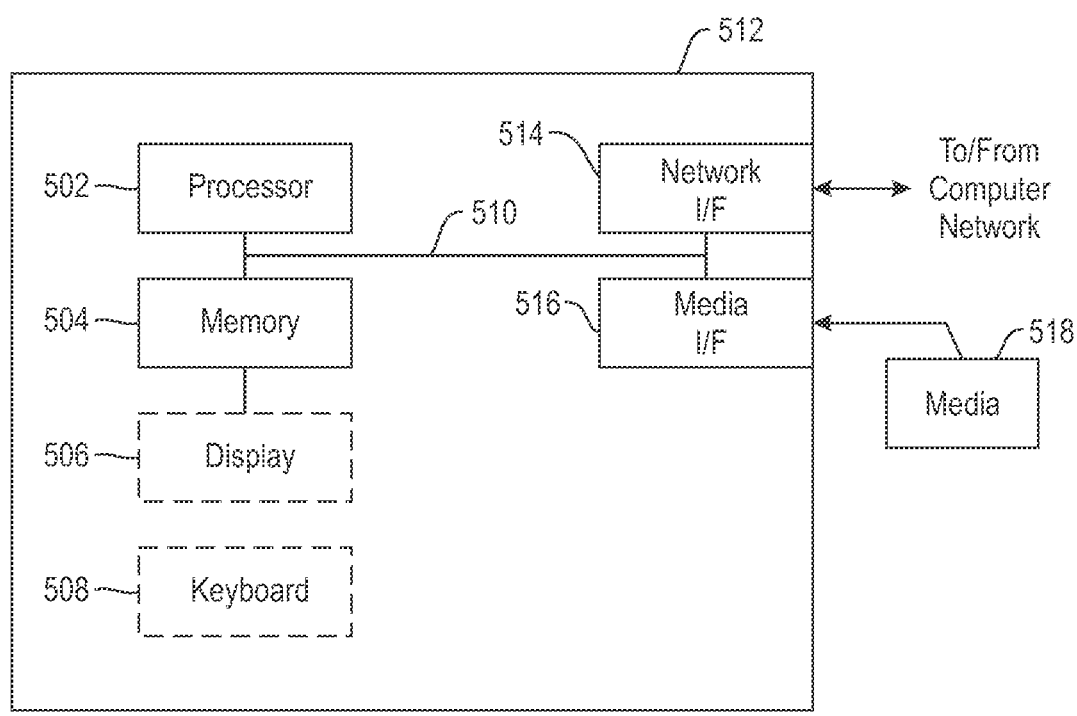
FIG. 5 is a system diagram of an exemplary computer system on which at least one embodiment of the invention can be implemented.

Additionally, an aspect of the present invention can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, enabling an application installed on a mobile device to interact with other applications installed on the mobile device by exposing and combining service capabilities of the given applications.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

exposing multiple capabilities from a set of multiple applications installed on an operating system of a user device to a configuration module executing on the operating system of the user device, wherein said exposing comprises (i) presenting the set of multiple applications installed on the operating system of the user device to a user via an interface of the user device, and (ii) exposing the multiple capabilities from the set of multiple applications in response to a user selection via the interface;

defining conditional rules associated with using each of the multiple exposed capabilities for use exclusively by said user device, wherein each of the conditional rules comprises a specification of one or more events that automatically trigger execution of one or more of said multiple exposed capabilities; and automatically invoking one or more of the multiple exposed capabilities and one or more of the defined conditional rules to automatically execute a user-defined task, wherein said invoking is carried out by a super application executing on the operating system of the user device which causes one or more applications from the set that correspond to the one or more exposed capabilities to automatically perform the one or more exposed capabilities in accordance with the one or more defined conditional rules.

2. The method of claim 1, wherein said defining comprises identifying one or more settings in which one or more of said conditional rules are applicable.

3. The method of claim 1, wherein said defining comprises determining a type of input to be associated with one or more of the exposed capabilities.

4. The method of claim 1, wherein said defining comprises determining a type of output to be associated with one or more of the exposed capabilities.

5. The method of claim 1, wherein said defining comprises specifying one or more interactions between two or more of the multiple applications installed on the operating system of the user device.

6. The method of claim 1, comprising:

maintaining a record of each of the multiple applications from which said multiple capabilities have been exposed to the configuration module.

7. The method of claim 1, comprising:

maintaining a record of each of the multiple capabilities exposed to the configuration module.

8. The method of claim 1, comprising:

determining a unique identifier corresponding to each of the multiple applications from which said multiple capabilities have been exposed to the configuration module; and determining a unique identifier corresponding to each of the multiple capabilities exposed to the configuration module.

9. The method of claim 8, wherein said invoking comprises associating the unique identifiers corresponding to said given multiple capabilities with each of one or more applications that exposed said given multiple capabilities to the configuration module.

10. The method of claim 1, wherein the one or more events comprise one or more events occurring internally within the user device.

11. The method of claim 1, wherein the one or more events comprise one or more events occurring externally of the user device and captured by the user device via the Internet.

12. A computer program product, the computer program product comprising a computer readable storage medium having program instructions embodied therewith, the program instructions executable by a computing device to cause the computing device to:

expose multiple capabilities from a set of multiple applications installed on an operating system of a user device to a configuration module executing on the operating system of the user device, wherein said exposing comprises (i) presenting the set of multiple applications installed on the operating system of the user device to a user via an interface of the user device, and (ii) exposing the multiple capabilities from the set of multiple applications in response to a user selection via the interface;

define conditional rules associated with using each of the multiple exposed capabilities for use exclusively by said user device, wherein each of the conditional rules comprises a specification of one or more events that automatically trigger execution of one or more of said multiple exposed capabilities; and automatically invoke one or more of the multiple exposed capabilities and one or more of the defined conditional rules to automatically execute a user-defined task, wherein said invoking is carried out by a super application executing on the operating system of the user device which causes one or more applications from the set that correspond to the one or more exposed capabilities to automatically perform the one or more exposed capabilities in accordance with the one or more defined conditional rules.

13. The computer program product of claim 12, wherein said defining comprises identifying one or more settings in which one or more of said conditional rules are applicable.

14. The computer program product of claim 12, wherein said defining comprises determining a type of input to be associated with one or more of the exposed capabilities.

15. The computer program product of claim 12, wherein said defining comprises determining a type of output to be associated with one or more of the exposed capabilities.

16. The computer program product of claim 12, wherein said defining comprises specifying one or more interactions between two or more of the multiple applications installed on the operating system of the user device.

17. The computer program product of claim 12, wherein the program instructions executable by a computing device further cause the computing device to:

maintain a record of each of the multiple applications from which said multiple capabilities have been exposed to the configuration module.

18. The computer program product of claim 12, wherein the program instructions executable by a computing device further cause the computing device to:

maintain a record of each of the multiple capabilities exposed to the configuration module.

19. A system comprising:

a memory; and at least one processor coupled to the memory and configured for:

exposing multiple capabilities from a set of multiple applications installed on an operating system of a user device to a configuration module executing on the operating system of the user device, wherein said exposing comprises (i) presenting the set of multiple applications installed on the operating system of the user device to a user via an interface of the user device, and (ii) exposing the multiple capabilities from the set of multiple applications in response to a user selection via the interface;

defining conditional rules associated with using each of the multiple exposed capabilities for use exclusively by said user device, wherein each of the conditional rules comprises a specification of one or more events that automatically trigger execution of one or more of said multiple exposed capabilities; and automatically invoking one or more of the multiple exposed capabilities and one or more of the defined conditional rules to automatically execute a user-defined task, wherein said invoking is carried out by a super application executing on the operating system of the user device which causes one or more applications from the set that correspond to the one or more exposed capabilities to automatically perform the one or more exposed capabilities in accordance with the one or more defined conditional rules.

20. A user device comprising:

a configuration module, executing on the user device, to:

compile multiple capabilities exposed from a set of multiple applications installed on the user device;

define conditional rules associated with using the multiple exposed capabilities for use exclusively by said user device, wherein each of the conditional rules comprises a specification of one or more events that automatically trigger execution of one or more of said multiple exposed capabilities; and a super application, automatically executing on the user device, to automatically invoke one or more of the multiple exposed capabilities, and one or more of the defined conditional rules to automatically execute a user-defined task, wherein said super application causes one or more applications from the set that correspond to the one or more exposed capabilities to automatically perform the one or more exposed capabilities in accordance with the one or more defined conditional rules;

wherein the configuration module is a component of the super application, and wherein the super application is coupled to: (i) a graphical user interface for user manipulation of (a) the multiple exposed capabilities and (b) the defined conditional rules, and (ii) a display for presentation to a user.

* * * * *